United States Patent
Gillard et al.

[11] Patent Number: 6,116,309
[45] Date of Patent: Sep. 12, 2000

[54] TREAD FOR A TIRE INCLUDING FIVE RIB PARTS

[75] Inventors: Jean-Michel Gillard, Mersch; Georges Gaston Feider, Bettborn, both of Luxembourg; Christian Jean-Marie Roger Bawin, Saint-Georges sur-Meuse, Belgium

[73] Assignee: The Goodyear Tire & Rubber Company, Akron, Ohio

[21] Appl. No.: 09/064,018

[22] Filed: Apr. 21, 1998

Related U.S. Application Data

[63] Continuation-in-part of application No. 29/070,031, Apr. 25, 1997, Pat. No. Des. 395,626.

[51] Int. Cl.[7] .......................... B60C 11/04; B60C 11/12; B60C 11/13; B60C 101/00

[52] U.S. Cl. .............................. 152/209.14; 152/209.19; 152/209.21; 152/209.22; 152/454; 152/901; 152/DIG. 1; 152/DIG. 3

[58] Field of Search ................ 152/209.14, 209.15, 152/209.18, 209.19, 209.21, 209.22, DIG. 1, DIG. 3, 454, 900, 901

[56] References Cited

U.S. PATENT DOCUMENTS

| | | | |
|---|---|---|---|
| D. 301,857 | 6/1989 | Clunk et al. | D12/147 |
| D. 303,945 | 10/1989 | Tsuda et al. | D12/147 |
| D. 311,887 | 11/1990 | Adam | D12/147 |
| D. 314,363 | 2/1991 | Adam | D12/147 |
| D. 334,370 | 3/1993 | White | D12/147 |
| D. 334,371 | 3/1993 | Hodges | D12/147 |
| D. 360,859 | 8/1995 | Attinello et al. | D12/147 |
| D. 362,215 | 9/1995 | White | D12/147 |
| D. 395,626 | 6/1998 | Gillard et al. | D12/147 |
| 2,186,180 | 1/1940 | Sloman et al. | 152/DIG. 3 |
| 2,604,920 | 7/1952 | Kirby | 152/209.18 |
| 2,756,797 | 7/1956 | Campbell | 152/209.18 |
| 4,271,885 | 6/1981 | Takigawa et al. | 152/209.18 |
| 4,345,632 | 8/1982 | Takigawa et al. | 152/209.19 |
| 4,446,901 | 5/1984 | Endo et al. | 152/900 |
| 5,097,882 | 3/1992 | Adams et al. | 152/DIG. 3 |
| 5,549,146 | 8/1996 | Trabandt et al. | 152/209.19 |
| 5,647,926 | 7/1997 | van der Meer et al. | 152/209 |
| 5,660,652 | 8/1997 | Young et al. | 152/209 |
| 5,909,756 | 6/1999 | Miyazaki | 152/DIG. 3 |

FOREIGN PATENT DOCUMENTS

| | | | |
|---|---|---|---|
| 348335 | 12/1989 | European Pat. Off. | 152/209.22 |
| 2951444 | 7/1980 | Germany | 152/209.21 |
| 3539530 | 5/1986 | Germany | 152/DIG. 3 |
| 50-98002 | 8/1975 | Japan | 152/DIG. 1 |
| 63-134312 | 6/1988 | Japan | 152/209.22 |
| 1-153304 | 6/1989 | Japan | 152/209.21 |
| 2-81704 | 3/1990 | Japan | 152/454 |

*Primary Examiner*—Steven D. Maki
*Attorney, Agent, or Firm*—Roger D Emerson

[57] ABSTRACT

A new pneumatic radial ply truck tire 10 for use on steering axles has a tread 12 with four circumferential grooves 14 that divide the tread 12 into a pair of shoulder rows 24, a pair of riding rows 26 and a center row 28. Lateral grooves 20 divide the rows into block elements 22. The centerline grooves 14 and shoulder grooves 16 have top and bottom potions 30, 32. The top portions 30 have straight sides 42 that are angled at top angles A1. The middle portions 32 also have straight sides 44 that are angled at bottom angles A2. To provide the grooves 14 with a general V-shape, it is preferred that the bottom angles A2 be greater than their respective top angles A1. Stone penetration protectors 34 are positioned within the circumferential grooves 34 to protect the tread 12 and the belt-package 13 from stone damage. The lateral grooves 20 that extend across the two riding rows 26 and the center row 28 have top portions 50 and bottom portions 52. The top portions 50 have first widths W1 and first depths D1 and the bottom portions 52 have second widths W2 and second depths D2 that extend to at least 85% of the tread non-skid depth D. The center row 28 and the riding rows 26 are formed at a tread arc radius TAR. The center row 28 and the riding rows 26 have radiused tread surfaces 27 with a tread arc radius TAR. The shoulder rows 24 have flat linear tread surfaces 25 that are tangent to the tread arc radius TAR. This provides for outside edges 56 of the shoulder rows 24 that have a shoulder fall-off distance X2 that is less than the shoulder fall-off distance X1 that would occur if the tread was made fully with the tread arc radius TAR. This multi-radii shape reduces irregular wear.

11 Claims, 8 Drawing Sheets

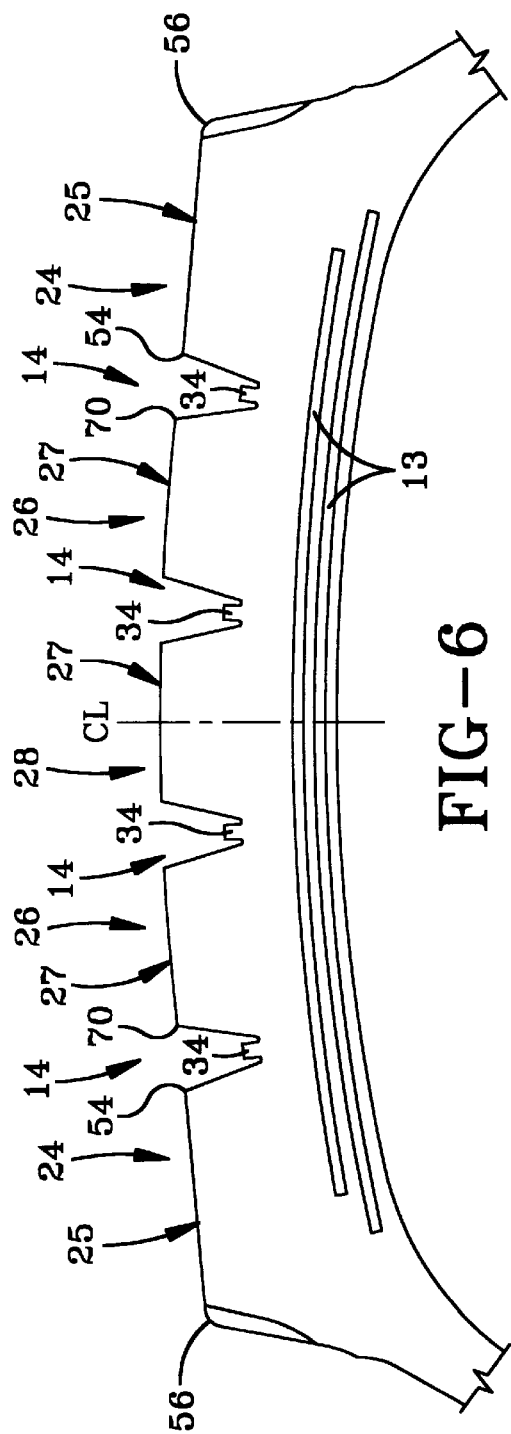
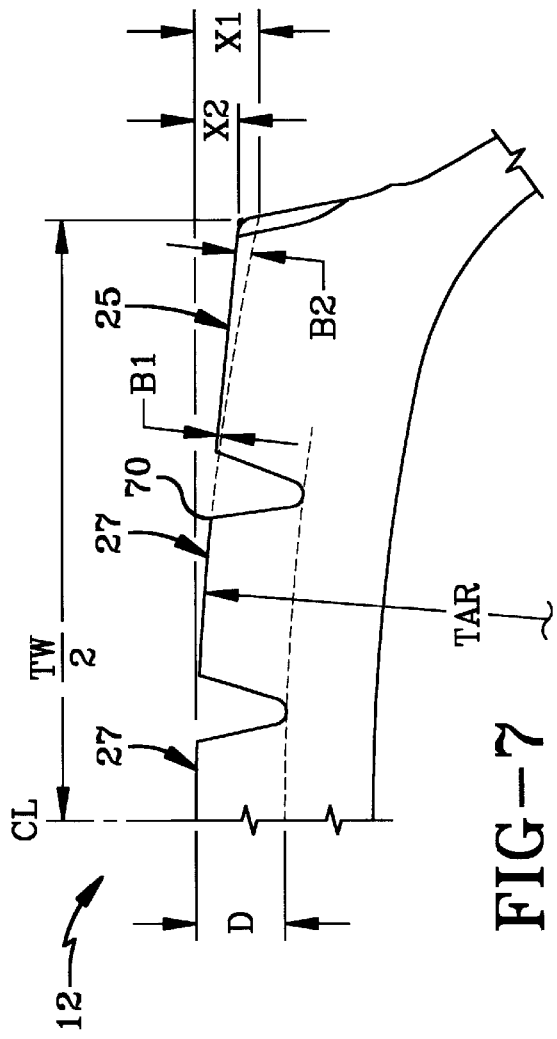
FIG-6
FIG-7

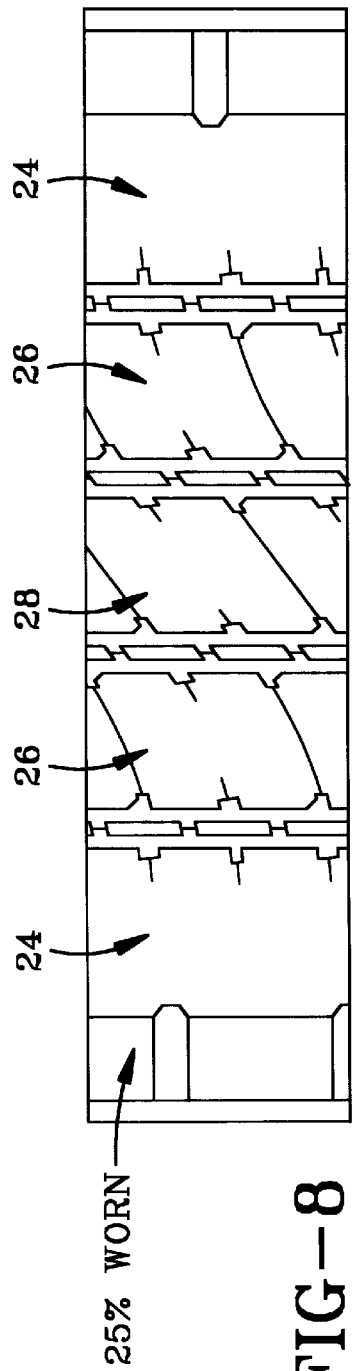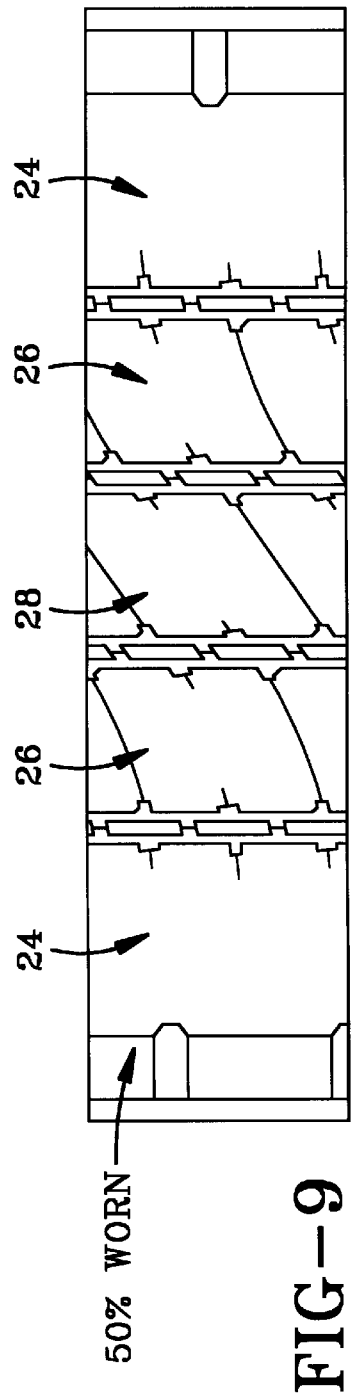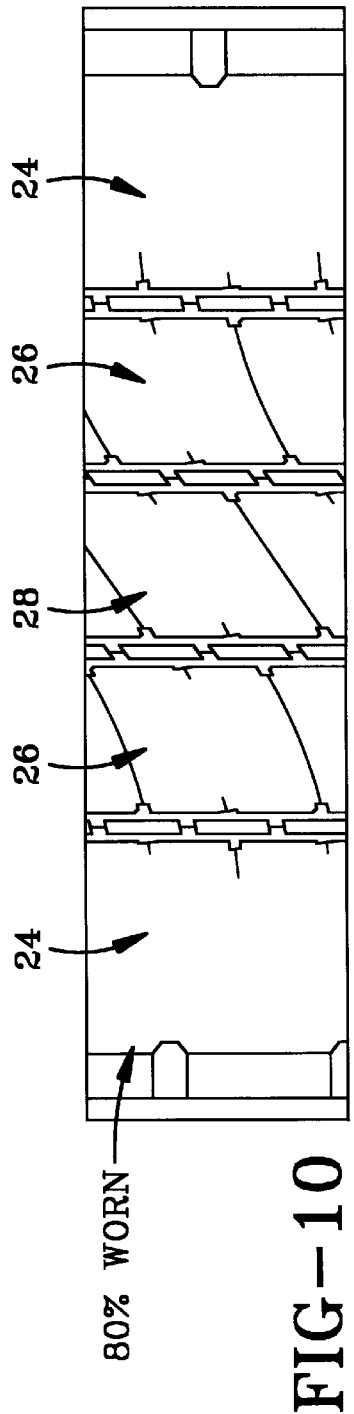

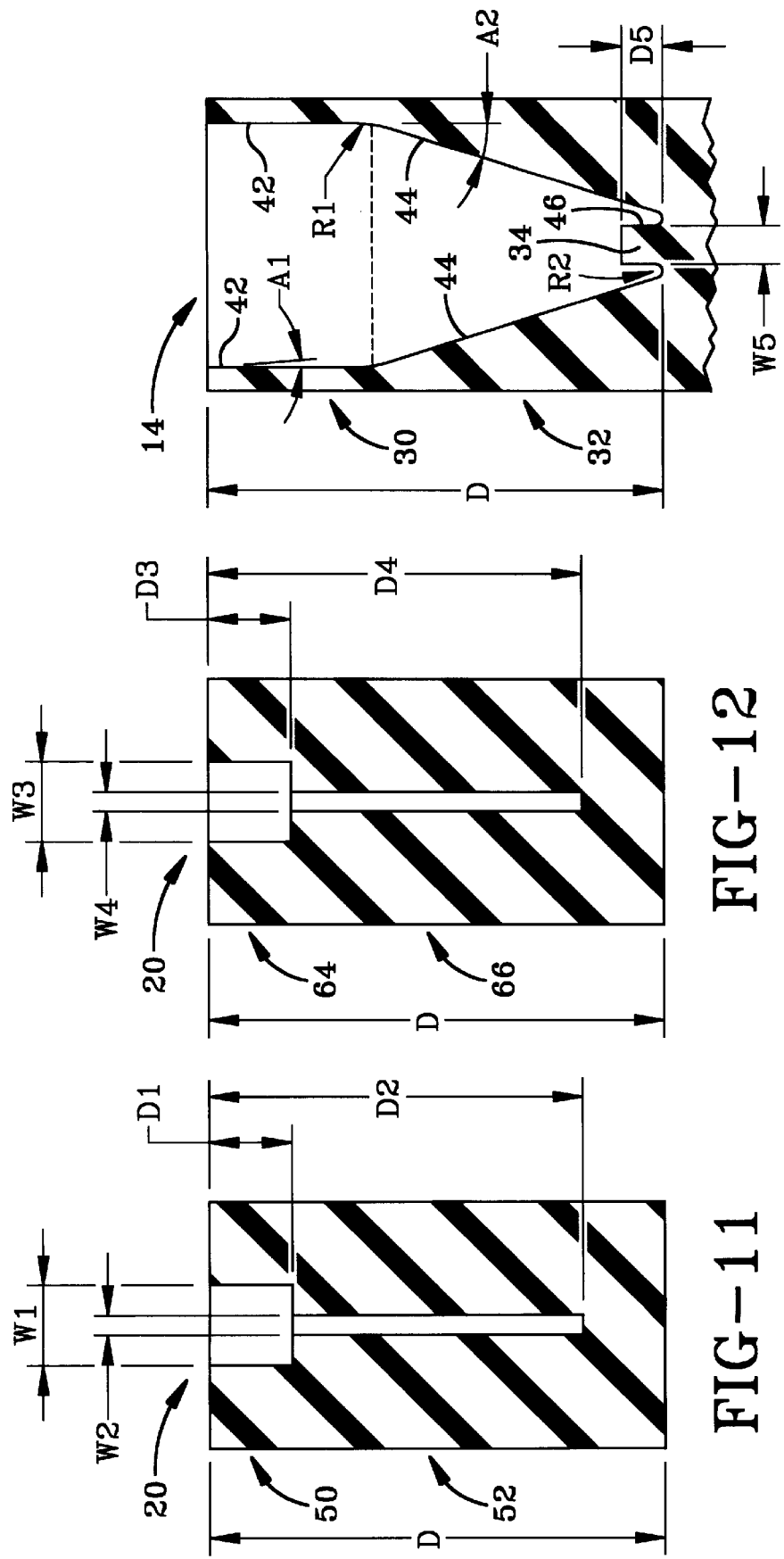

TREAD FOR A TIRE INCLUDING FIVE RIB PARTS

The applicant for this non-provisional continuation-in-part-utility application hereby claims priority based on the prior design application titled TREAD FOR A TIRE, filed on Apr. 25, 1997 and assigned application Ser. No. 29/070,031 now U.S. Pat. No. Des. 395,626.

TECHNICAL FIELD

Background Art

The present invention relates to truck tire treads and tires for steer axles.

The use of treads specifically designed for the steer axle of trucks is well known in the art. It is also known, however, to have problems with some such tires.

One problem is related to stones. It is known in the art for stones to become trapped or held within the grooves of the tread. Such stones may damage the groove bottoms and the belt-package that lies beneath the tread. This process is sometimes known as "stone drilling."

Another problem relates to irregular wear in the shoulder ribs of steer tires. Such irregular shoulder wear is known to produce peaking on the inside edge of the shoulder rib and drop off on the outside edge of the shoulder rib.

It is also an ongoing desire to provide steer tires having a slower wear rate, an even wear profile and excellent traction.

The present invention provides circumferential grooves that are provided with stone penetration protectors, and lateral grooves having first and second portions to minimize wear. The present invention also minimizes irregular shoulder wear by using a multi-radii tread shape.

DISCLOSURE OF THE INVENTION

A new pneumatic radial ply truck tire 10 for use on steering axles is described. The tire 10 has a tread 12 with four circumferential grooves 14 that divide the tread 12 into a pair of shoulder rows 24, a pair of riding rows 26 and a center row 28. Lateral grooves 20 divide the rows into block elements 22. The circumferential grooves 14 each have top and bottom portions 30, 32. The top portions 30 have straight sides 42 that are angled at top angles A1. The bottom portions 32 also have straight sides 44 that are angled at bottom angles A2. To provide the grooves 14 with a general V-shape, it is preferred that the bottom angles A2 be greater than their respective top angles A1. The bottom portions 32 have stone penetration protectors 34 to protect the grooves 14 and any belt-package 13 for stone damage.

The sides 42 of the top portions 30 are linked to the respective sides 44 of the bottom portions 32 with radii RI within the range of 5.0 mm to 15.0 mm. The sides 44 of the bottom portions 32 are linked to the respective sides 46 of the stone penetration protectors 34 with radii R2 within the range of 0.1 mm to 1.0 mm.

The lateral grooves 20 that extend fully across the two riding rows 26 and the center row 28 have top and bottom portions 50, 52. The top portions 50 have first widths Wi, and first depths D1 that extend to less than 20% of the tread non-skid depth D. The bottom portions 52 have second widths W2 and second depths D2 that extend to at least 85% of the tread non-skid depth D. In this way the lateral grooves 20 help in providing the tire 10 with an even wear profile, high mileage and safe wet performance The center row 28 and the riding rows 26 have radiused tread surfaces 27 with a tread arc radius TAR. The shoulder rows 24 have flat linear tread surfaces 25 that are tangent to the tread arc radius TAR. This provides for outside edges 56 of the shoulder rows 24 that have a shoulder fall-off distance X2 that is less than the shoulder fall-off distance X1 that would occur if the tread was made fully with the tread arc radius TAR. This multi-radii shape reduces irregular wear. The two shoulder rows 24 have a shoulder width SHW and the two riding rows 26 and the center row 28 each have a center width CW. A width ratio equal to SHW divided by CW is at least 1.25. This helps in achieving equal pressure distribution across the surface of the tread 12.

Thus, the tire 10 of this invention having the tread 12 can exhibit a high wear rate and an even wear profile. It also protects the grooves 14 and belt-package 13 from damage due to stones.

BRIEF DESCRIPTIONS OF THE DRAWINGS

FIG. 6 is a cross-sectional view of the tread 12 according to the present invention.

FIG. 7 is a sectional view of half of the tread 12 showing the offset of the shoulder rows.

FIG. 8 is a view of a portion of the tread pattern of the tread shown in FIG. 3 when the tread is 25% worn.

FIG. 9 is a view of a portion of the tread pattern of the tread shown in FIG. 3 when the tread is 50% worn.

FIG. 10 is a view of a portion of the tread pattern of the tread shown in FIG. 3 when the tread is 80% worn.

Figure 1:
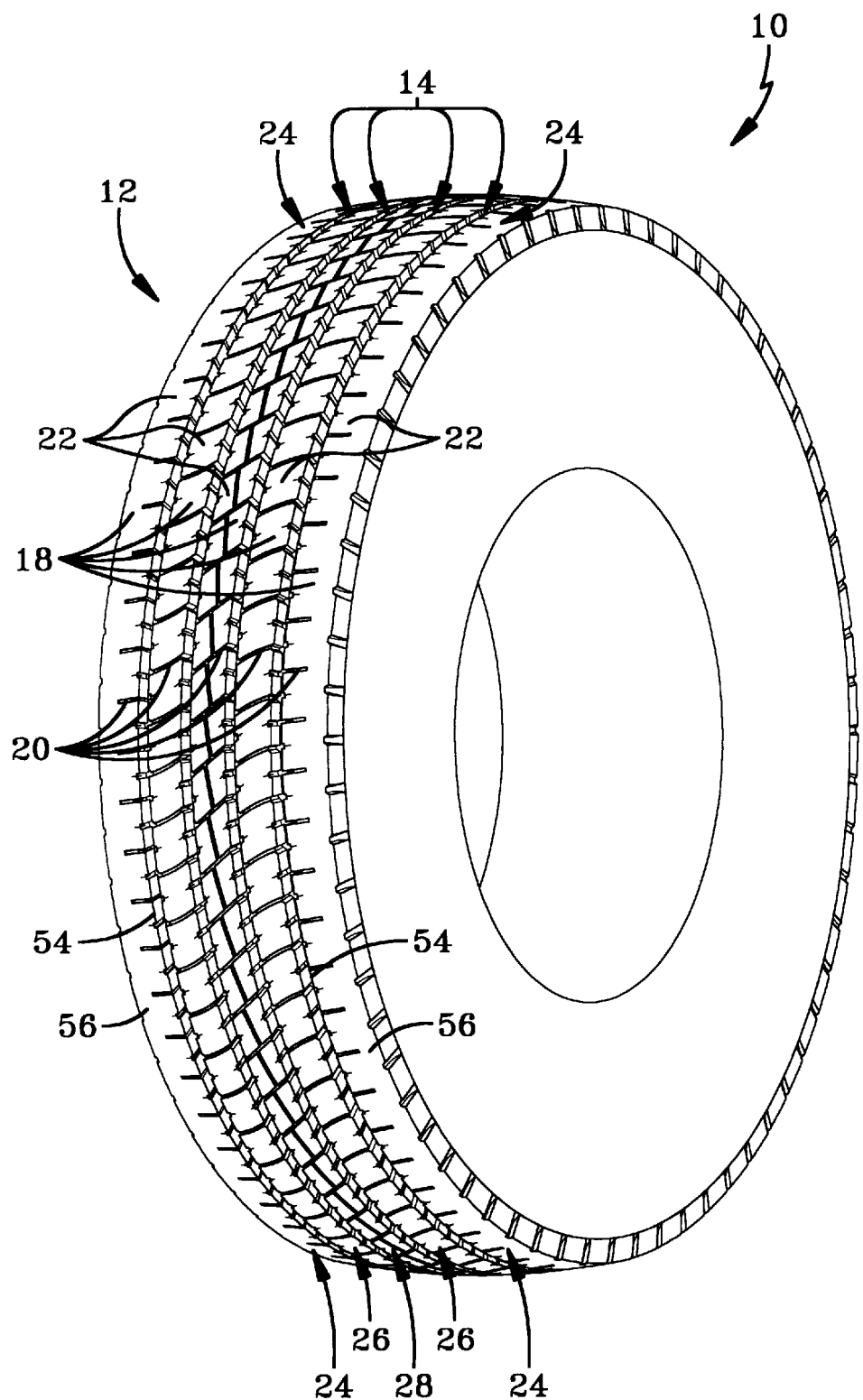
FIG. 1 is a perspective side elevation view of the tire 10 according to the present invention.
Figure 2:
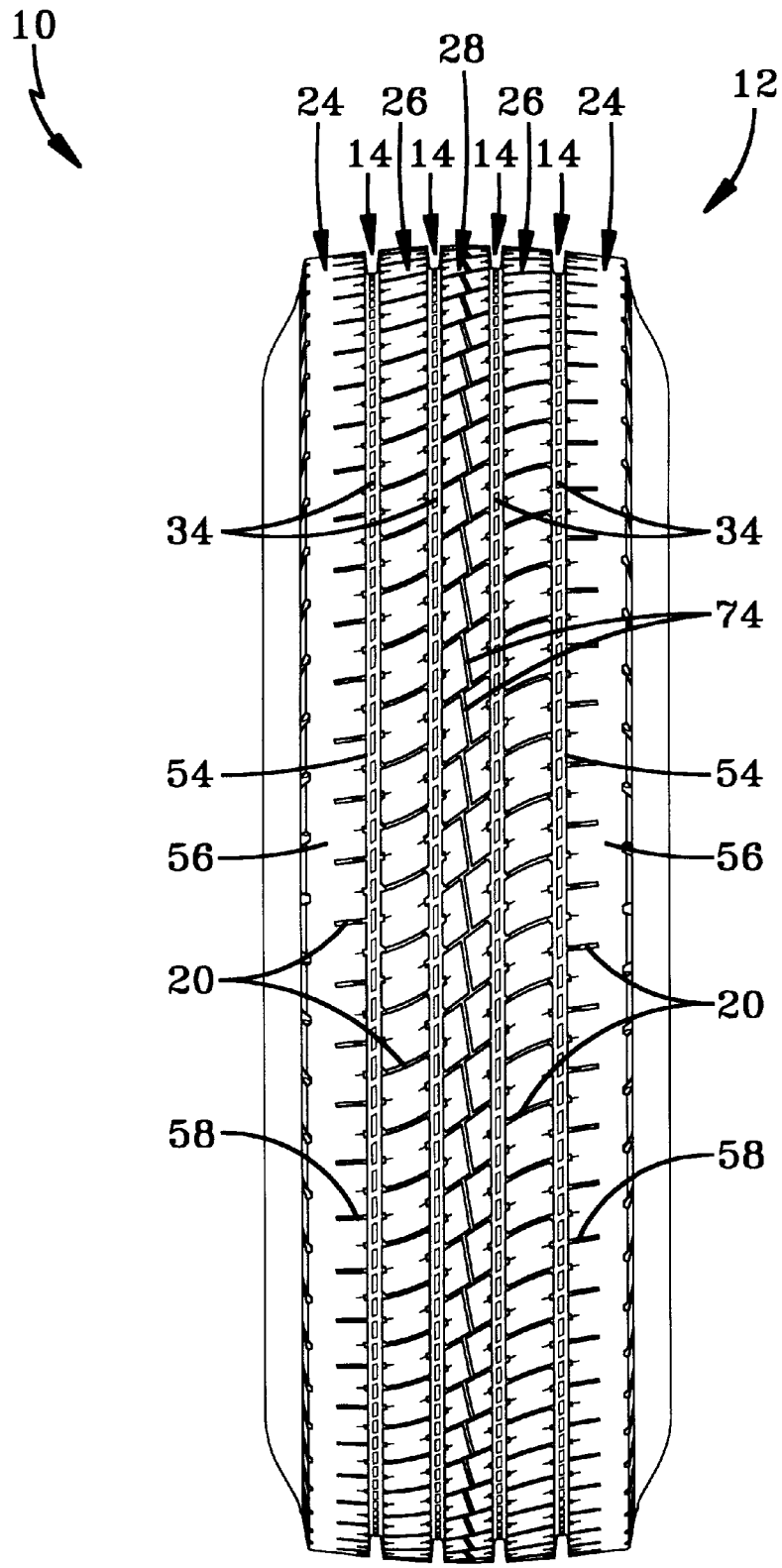
FIG. 2 is a front elevation view of the tire 10 of FIG. 1.
Figure 3:
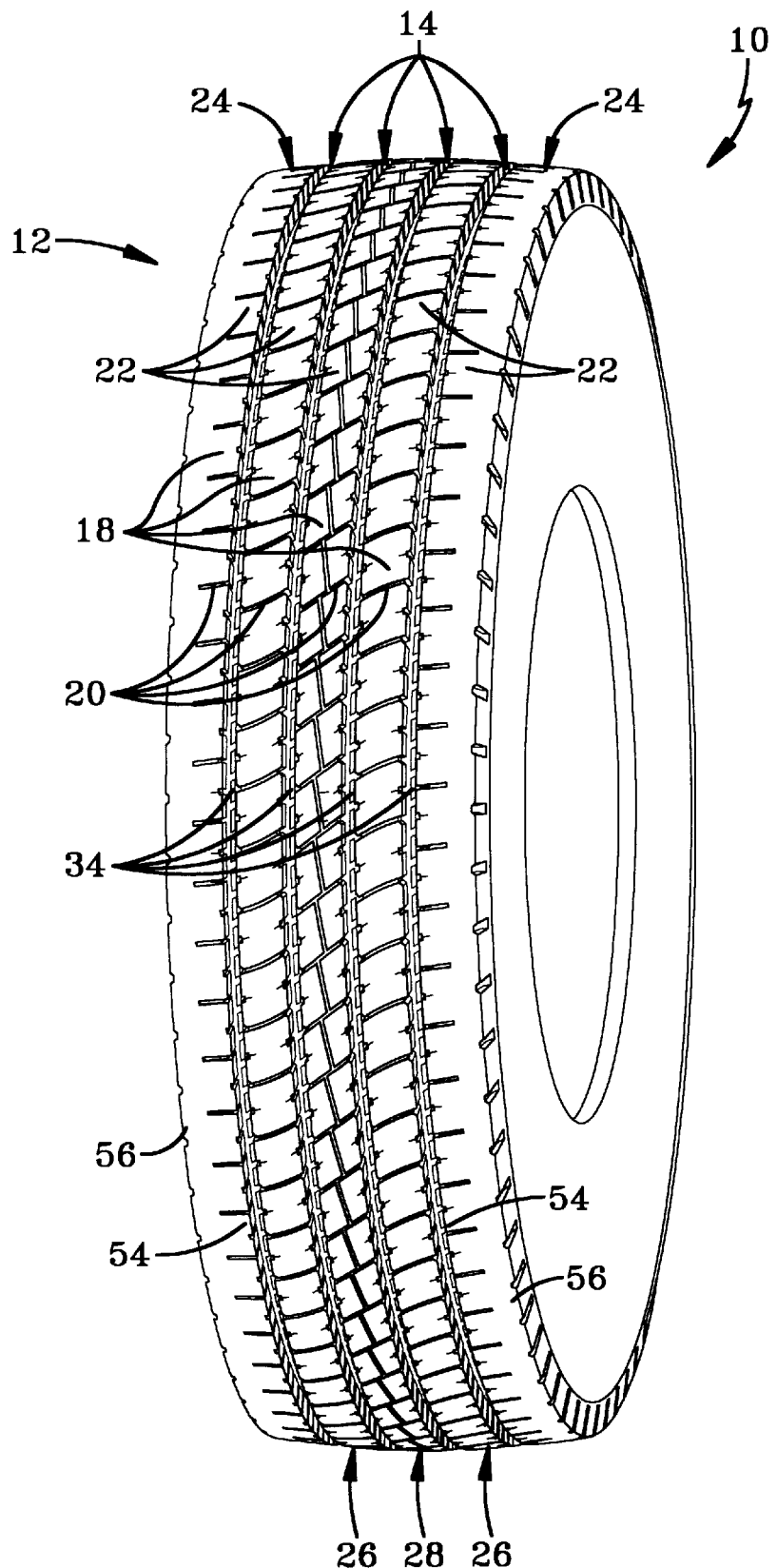
FIG. 3 is a perspective front elevation view of the tire 10 of FIG. 1 showing in more detail the stone penetration protectors 34.
Figure 4:
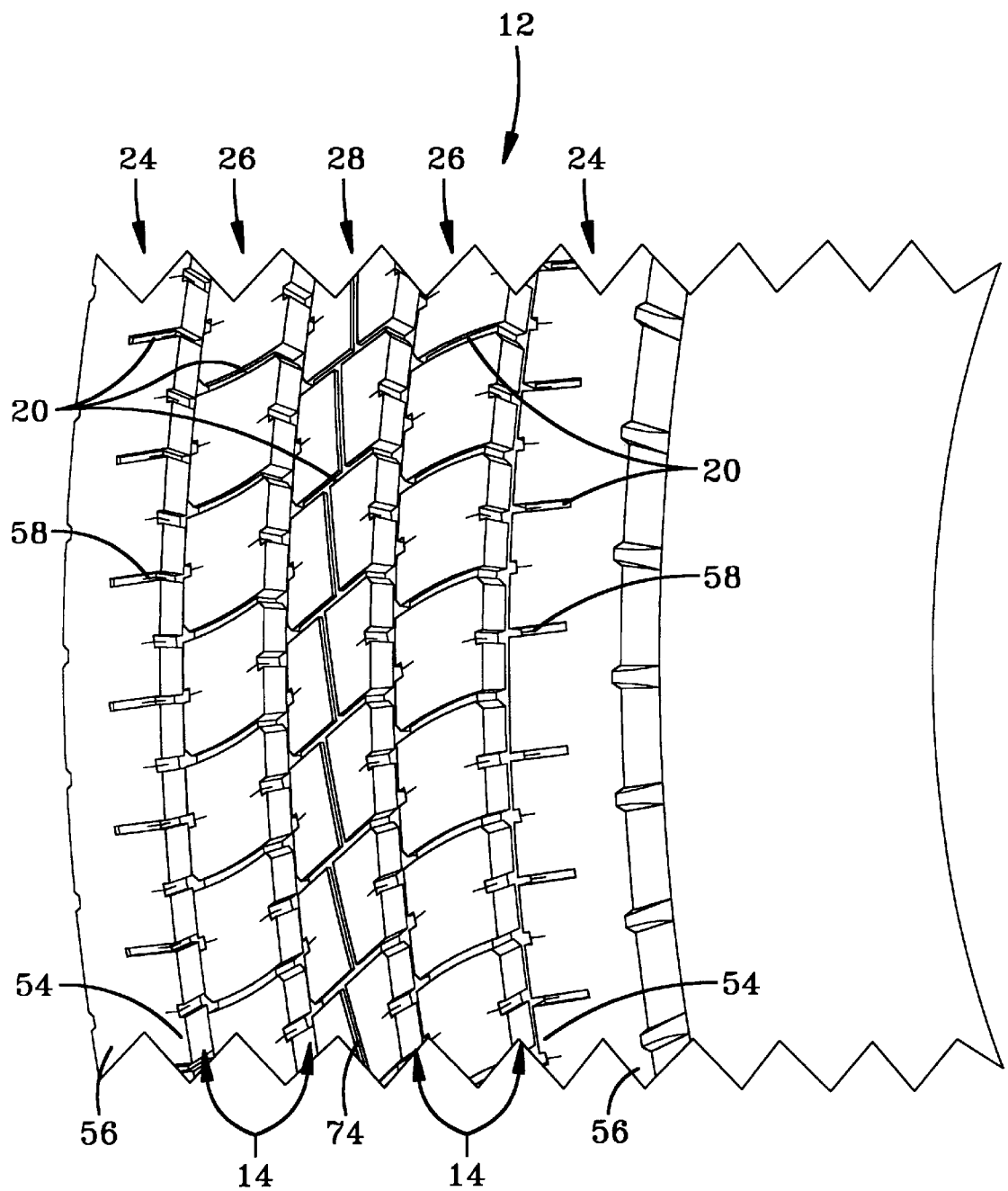
FIG. 4 is a perspective view of a portion of the tread pattern of the tread 12 shown in FIG. 1.
Figure 5:
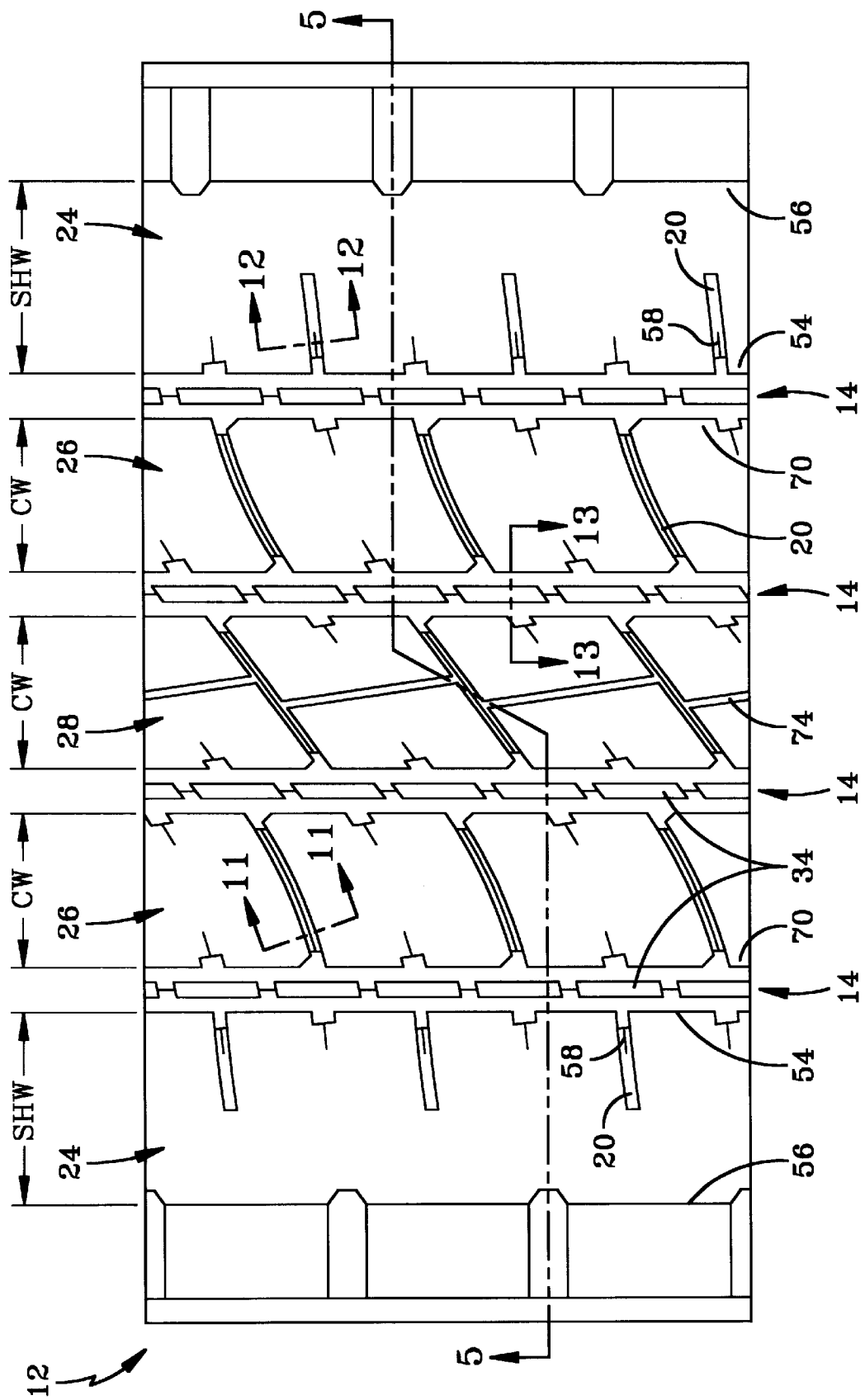
FIG. 5 is a view of a portion of the tread pattern of the tread 12 shown in FIG. 3.

FIG. 11 is a sectional view of the lateral grooves 20 in the center row 28 and riding rows 26 taken along the lines 8—8 of FIG. 5.

FIG. 12 is a sectional view of the lateral grooves 20 in the shoulder rows 24 taken along the lines 9—9 of FIG. 5.

FIG. 13 is a sectional view of the circumferential grooves 14 taken along the lines 10—10 of FIG. 5.

DEFINITIONS

"Axial" and "axially" means lines or directions that are parallel to the axis of rotation of the tire.

"Block Element" means a tread element defined by a circumferential groove or shoulder and a pair of lateral extending grooves.

"Circumferential" means lines or directions extending along the perimeter of the surface of the annular tread perpendicular to the axial direction.

"Equatorial Plane (EP)" means the plane perpendicular to the tire's axis of rotation and passing through the center of its tread.

"Groove" means an elongated void area in a tread that may extend circumferentially or laterally about the tread in a straight, curved, or zigzag manner. Circumferentially and laterally extending grooves sometimes have common portions. The "groove width" is equal to the tread surface area occupied by a groove or groove portion, the width of which is in question, divided by the length of such groove or groove portion; thus, the groove width is it average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves that they interconnect, they are regarded as forming "tire bars" tending to maintain a rib-like character in the tread region involved.

"Lateral" means an axial direction.

"Net-to-gross ratio" means the total area of ground contracting tread elements between the lateral edges around the entire circumference of the tread divided by the gross area of the entire tread between the lateral edges.

"Radially" and "radially" means directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Rib" means a circumferentially extending strip of rubber of the tread which is defined by at least one circumferential groove and either a second such groove or a lateral edge, the strip being laterally undivided by full-depth grooves.

"Shoulder" means the upper portion of sidewall just below the tread edge; tread shoulder or shoulder rib means that portion of the tread near the shoulder.

"Sipe" means small slots molded into the tread elements of the tire that subdivide the tread surface and improve traction.

"Tread" means a rubber or elastomeric component including that portion of the tire that comes into contact with the road under normal inflation and load.

"Tread element" or "traction element" means a rib or a block element.

DETAILED DESCRIPTION OF THE PREFERRED EMBODIMENT

Referring now to the drawings wherein the showings are for purposes of illustrating a preferred embodiment of the invention only and not for purposes of limiting the same, FIGS. 1–6 show a pneumatic radial ply truck tire 10 for use on the steering axles that has a tread 12 with a non-skid depth D. The tread 12 provides a high wear rate and an even wear profile as will be discussed further below. The tread 12 includes four circumferential grooves 14 that divide the tread 12 into five rib parts 18. Lateral grooves 20 extend across at least a portion of the five rib parts 18 of the tread 12 to form five rows of circumferentially separated block elements 22 including two shoulder rows 24, two riding rows 26 and a center row 28.

With reference now to FIGS. 2–3, 5–6 and 13, in order to minimize possible stone damage to the grooves or the belt-package 13 caused by stones being trapped or held within the grooves, the four circumferential grooves 14 each have top and bottom portions 30, 32 respectively. The top portions 30 have straight sides 42 angled at top angles A1 relative to radial lines extending from the edges of the grooves at the maximum groove width as shown in FIG. 13. The bottom portions 32 also have straight sides 44 that are angled at bottom angles A2 with respect to the radial lines extending from the edges of the grooves at the maximum groove width. To provide the grooves 14 with a general V-shape, it is preferred that the middle angles A2 be greater than their respective top angles A1 respectively. This provides for increased groove wall taper angles positioned where they are the most useful for stone ejection in the bottom portion 32 of the grooves 14. It is most preferred that the top angles A1 be within the range of 0° to 5° and that the middle angles A2 be within the range of 100 to 200.

With reference now to FIGS. 6 and 13, the stone penetration protectors 34 are formed in the bottom portions 32 of the grooves 14. The stone penetration protectors 34 prevent any stones from damaging the grooves 14 or the belt-package 13 under the tread. The stone penetration protectors 34 are preferably rectangular in cross-sectional shape having a width W5 and a height D5. The width W5 and height D5 are preferably each less than 25% of the tread non-skid depth D. The fact that the grooves 14 will close as the tread wears toward the stone penetration protectors 34, is irrelevant because at that stage truck tires have reached the top of the legally require tread-wear indicators. It is preferred that the width W5 and height D5 each be less than 3.5 mm.

Still referring to FIGS. 6 and 13, the sides 42 of the top portions 30 are linked to the sides 44 of the bottom portions 32 by radii R1. It is most preferred that the radii R1 be within the range of 5.0 mm to 15.0 mm to provide a smooth transition from the top portions 30 to the bottom portions 32. The sides 44 of the bottom portions 32 are linked to respective sides 46 of the stone penetration protectors 34 by radii R2. The radii R2 provide a short yet cornerless transition to the stone penetration protectors 34. Preferably, the radius R2 is within the range of 0.1 mm to 1.0 mm.

With reference now to FIGS. 1–6 and 11, the lateral grooves 20 that extend fully across the two riding rows 26 and the center row 28 have top and bottom portions 50, 52. The top portions 50 have first widths W1 and first depths D1 that extend to less than 20% of the tread non-skid depth D. The bottom portions 52 have second widths W2 and second depths D2 that extend to at least 85% of tread non-skid depth D. This design provides block elements 22 that will provide even wear, high mileage and safe wet performance. It is most preferred that the second depths D2 extend to about 90% of the tread non-skid depth D. The bottom portions 52 are formed by blades (not shown) inserted into the truck tire molds (not shown). These blades provide for bottom portions 52 that extend to a constant depth level.

With reference now to FIGS. 1–6 and 12, it can be seen that the lateral grooves 20 that extend partially across the two shoulder rows 24 have inside ends 58 comprising top portions 64 and bottom portions 66. Since the lateral grooves 20 do not extend fully across the shoulder rows 24, the shoulder rows have rib parts 18 that are solid. The top portions 64 have first widths W3 and first depths D3 that preferably extend to less than 20% of the tread non-skid depth D. The bottom portions 66 have a second width W4 and a second depth D4 that preferably extends to at least 85% of the tread non-skid depth D. The bottom portions 66 are formed with blades as discussed above. The remaining parts of the lateral grooves 20 that extend partially across the two shoulder rows 24 do not have bottom portions but maintain the first width W3 and the first depth D3.

With reference now to FIGS. 1–7, the applicants believe that irregular shoulder wear can be initiated where groove edge amplitudes create variations in lateral stiffness. These variations may be caused by rib width variations, groove taper angle changes, notches, blades, and other design modifications as well. The effect of these amplitudes is believed to decrease with the tread non-skid depth level. In other words, the effects of the amplitudes are at their greatest in the new, unworn tire and are the greatest for deep tread non-skid depth D steer tires on trucks. Therefore to minimize the potential for irregular shoulder wear and to minimize the noise levels, the shoulder rows 24 have inside edges 54 that are straight in the circumferential direction. It should be noted that the inside edges 54 are straight in the circumferential direction regardless of the tread non-skid depth.

With continuing reference to FIG. 1–7, irregular shoulder wear creates shoulder peaking and shoulder drop-off. Peaking refers to areas of the tread surface that are radially higher than the rest of the tread surface and drop-off refers to the areas of the tread surface that are worn more (radially lower) than the rest of the tread surface. To combat shoulder peaking and shoulder drop-off, the tread 12 of this invention is formed by what is termed a multi-radii cavity shape. As shown in FIG. 6 the center row 28 and the riding rows 26 have radiused tread surfaces 27 with a tread arc radius TAR.

Still referring to FIGS. 1–7, the shoulder rows 24 preferably are not radiused. FIG. 7 shows in a dashed line the tread arc radius TAR for the shoulder row area. As can be seen, the inside edges 54 of the shoulder rows 24 are slightly raised by a first distance B1 with respect to the tread arc radius TAR. The outside edges 56 are raised a second distance B2 with respect to the tread arc radius TAR that is greater than the first distance B1. In this way, the tread surface of the shoulder rows 24 is not radiused but rather is flat. In the preferred embodiment, the shoulder rows 24 have flat linear tread surfaces 27 that are tangent to the tread arc radius TAR. This provides for outside edges 56 of the shoulder rows 24 that have a shoulder fall-off distance X2 that is less than the shoulder fall-off distance X1 that would occur if the tread 12 was made fully with the tread arc radius TAR. It is most preferred that X2 be at least 10.0 mm. It is also preferred that the flat linear tread surfaces 25 extend tangently from the tread arc radius TAR from outer edges 70 of the riding rows 26.

Still referring to FIGS. 1–7, this multi-radii design is expected to shift pressure from the inside edge 54 of the shoulder rows 24 where peaking is known to occur to the outside edges 56 where drop-off occurs. Therefore, a more even pressure distribution will be obtained. To further combat shoulder peaking and shoulder drop-off, the two shoulder rows 24 have larger widths than the two riding rows 26 and the center row 28. In particular, the shoulder rows 24 each have a shoulder width SHW and the two riding rows 26 and the center row 28 each have a center width CW. A width ratio equal to SHW divided by CW is preferably at least 1.25.

With reference now to FIGS. 1–6, the tread 12 also includes nearly circumferencial grooves 74 in the center row 28 that link the lateral grooves 20 in the center row 28. These grooves 74 are relatively shallow having a depth preferably equal to the first depth D3 and have a width less than 3.0 mm. To maintain a high wear rate, it is also preferred that the tread 12 has a relatively high net-to-gross ratio. Most preferably the net-to-gross ratio is over 80%.

The invention has been described with reference to preferred embodiments. Obviously, modifications and alterations will occur to others upon a reading and understanding of the specification. It is intended to include all such modifications and alterations in so far as they come within the scope of the appended claims or the equivalence thereof.

Having thus described the invention, it is now claimed:

1. A pneumatic radial ply truck tire for use on steering axles having a tread with a tread non-skid depth D, four circumferential grooves dividing the tread into five rib parts, lateral grooves extending across at least a portion of the five rib parts of the tread, the lateral grooves forming five rows of circumferentially separated block elements including two shoulder rows, two riding rows and a center row, the tire being characterized by:

the center row and the riding rows having radiused tread surfaces, each of the radiused tread surfaces having a tread arc radius TAR, the shoulder rows having flat linear tread surfaces, the flat linear tread surfaces being tangent to the tread arc radius TAR from outer edges of the riding rows, the lateral grooves extending across the two riding rows, the lateral grooves of the center row each having top and bottom portions, the top portions having a first width W1 and a first depth D1, the first depth D1 extending to less than 20% of the tread non-skid depth D, the bottom portions having a second width W2 and a second depth D2, the second depth D2 extending to at least 85% of the tread non-skid depth D, the second width W2 being less than 30% of the first width W1; and, the two shoulder rows having partially extending lateral grooves, the partially extending lateral grooves having inside ends with top and bottom portions, the top portions having a first width W3 and a first depth D3 that extends to less than 20% of the tread non-skid depth D, the bottom portions having a width W4 and a second depth D4 that extends to at least 85% of the tread non-skid depth D, the remaining parts of the partially extending lateral grooves having widths equal to the first width W3 and depths equal to the first depth D3.

2. The pneumatic radial ply truck tire of claim 1 wherein the two shoulder rows each have a shoulder width SHW and the two riding rows and center row each have a center width CW, a width ratio equal to SHW divided by CW is at least 1.25.

3. The pneumatic radial ply truck tire of claim 2 wherein the two shoulder rows each have inside edges that are straight in the circumferential direction.

4. The pneumatic radial ply truck tire of claim 3 wherein the two shoulder rows are formed of solid rib parts.

5. The pneumatic radial ply truck tire of claim 1 wherein the block elements forming the center row are further divided by generally circumferential grooves that have a width equal to the first width W3 and a depth equal to the first depth D3, the generally circumferential grooves having ends that intersect consecutive lateral grooves extending across the center rows.

6. The pneumatic radial ply truck tire of claim 1 wherein a net-to-gross ratio of said tread is greater than 80%.

7. The pneumatic radial ply truck tire of claim 6 wherein each of the four circumferential grooves have top and bottom portions, the top portions of the circumferential grooves having straight sides, the straight sides being angled at a top angle with respect to radial lines extending from the edges of the grooves at the maximum groove width, the bottom portions of the circumferential grooves having straight sides angled at a bottom angle with respect to radial lines extending from the edges of the grooves at the maximum groove width, the bottom angles being greater than the top angles.

8. The pneumatic radial ply truck tire of claim 7 wherein the top angles are within the range of 0° to 5° and the bottom angles are within the range of 10° to 20°.

9. The pneumatic radial ply truck tire of claim 8 wherein the straight sides of the top portions and the straight sides of the bottom portions are connected together by a portion having a radius within the range of 5.0 mm to 15.0 mm.

10. The pneumatic radial ply truck tire of claim 9 wherein the four circumferential grooves have stone penetration protectors.

11. The pneumatic radial ply truck tire of claim 7 wherein a net-to-gross ratio of said tread is greater than 80%.

* * * * *